United States Patent [19]

Kittle

[11] Patent Number: 4,874,641
[45] Date of Patent: Oct. 17, 1989

[54] METHOD OF PROVIDING A BARRIER BETWEEN A SUBSTRATE AND THE ATMOSPHERE AND COMPOSITIONS THEREFOR

[75] Inventor: Paul A. Kittle, West Chester, Pa.

[73] Assignee: Rusmar Incorporated, West Chester, Pa.

[21] Appl. No.: 124,890

[22] Filed: Nov. 24, 1987

[51] Int. Cl.$^4$ ............................ B05D 5/00; B05C 1/16
[52] U.S. Cl. ..................................... 427/244; 427/136;
106/122; 252/321; 405/129
[58] Field of Search ..................... 106/122, 901; 252/3,
252/307, 308; 424/73; 427/136, 244; 425/128,
129

[56] References Cited

U.S. PATENT DOCUMENTS

| 2,167,180 | 7/1939 | Kritchevsky | 424/73 |
| 2,748,078 | 5/1956 | Perri | 252/3 |
| 2,945,322 | 7/1960 | Gaeth et al. | 252/3 |
| 4,421,788 | 12/1983 | Kramer | 427/136 |
| 4,519,338 | 5/1985 | Kramer et al. | 118/305 |

FOREIGN PATENT DOCUMENTS 154997 12/1982 India.

OTHER PUBLICATIONS

Chem. Abs., vol. 51:10928h, "Properties of Solutions of Mixtures of Alkylbenzene Sulfonate and Soap", Nevolin et al., 1957.

Primary Examiner—Theodore Morris
Attorney, Agent, or Firm—Howson & Howson

[57] ABSTRACT

A method of forming a temporary barrier between a substrate and the atmosphere by applying to the substrate a layer of foam generated from an aqueous composition comprising specified agents. Certain compositions especially adapted for this purpose are also provided.

11 Claims, No Drawings

METHOD OF PROVIDING A BARRIER BETWEEN A SUBSTRATE AND THE ATMOSPHERE AND COMPOSITIONS THEREFOR

The present invention relates to a novel method of providing a barrier between a substrate, like the layer of waste deposited in a landfill, and the atmosphere and to compositions especially adapted therefor.

BACKGROUND OF THE INVENTION

There are many areas where it is desirable to provide an inexpensive, temporary barrier layer between a substrate and the atmosphere. Such a barrier layer might serve to protect the atmosphere from deleterious materials which would escape from the substrate, such as odors and blowing trash from landfills, dust or noxious fumes from spills, and the like. Such a barrier layer might also be used to protect a substrate from adverse conditions in the atmosphere, as in protecting growing fruit, vegetables and plants from unseasonal frost.

In landfill operations for example, it has been suggested to replace the daily compacted earth cover with a hardenable plastic foam. This is the subject of U.S. Pat. Nos. 4,421,788 and 4,519,338. The foam employed according to these patents is prepared using a foaming agent and a liquid synthetic resin, such as a precondensate of urea and formaldehyde.

One principal advantage of using foam instead of the conventional dirt cover resides in the elimination of the expense of placing and compacting the earth which require significant labor and heavy equipment. Another advantage is the elimination of multiple, daily, layers of earth fill which occupy significant volume of the landfill.

OBJECTS OF THE INVENTION

It is the principal object of the present invention to provide a novel method for providing a barrier layer of foam between a substrate and the atmosphere, which has the advantages of prior foam applications and other advantages including less cost.

It is another object of the present invention to provide novel compositions adapted for the production of foams usable according to certain embodiments of the present method.

These and other objects will become apparent from a consideration of the following specification and the claims.

The method of the present invention for providing a barrier between a substrate and the atmosphere comprises applying to the substrate a foam prepared from an aqueous composition comprising, in an approximately 1:1 molar ratio, (A) an anionic surface active sulfate having the formula

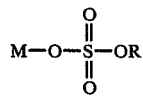

where —OR is an alkoxy, alkylenoxy or alkaryloxy group having from 10 to 20 carbon atoms or an alkyl polyether group

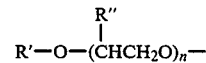

in which R' is an alkyl group containing from 10 to 20 carbon atoms, R" is H or an alkyl group containing up to 4 carbon atoms, preferably H or $CH_3$, and n is an integer from 1 to 12, preferably from 3 to 6, or a sulfonate having the formula

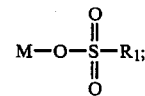

where $R_1$ is an alkyl, alkylene or alkaryl group containing from 10 to 20 carbon atoms, and where M is a monovalent cation, and (B) a carboxylic acid salt, $R_2COOM_1$, where $R_2$ is an alkyl group containing from 8 to 30 carbon atoms and $M_1$ is a monovalent cation.

It has been found that foam prepared as described above has a surprising long life as compared to aqueous foams in general, and possesses a stiffness much like cotton candy and does not cold flow or relax. Thus, it can be applied to an irregular, rough or sloping surface, such as a landfill, where, barring extremely harsh weather, it will retain its integrity and continuity until the next day or longer. There appears to be a synergism between the two main components in the proportion stated that provides a stability to the resulting foam in the out-doors on irregular surfaces and under widely varying temperature conditions far in excess of that to be expected from foams prepared from either one alone or in combination with other foam "stabilizers". It is likely that at the 1:1 mole ratio a complex is formed between the anionic surface active sulfate/sulfonate and the carboxylic acid salt and this may account for the marked stability of the foam. The complex in water provides a translucent or turbid appearance similar to liquid soap.

One of the two main components of the foaming composition used according to the present method is an anionic surface active sulfate or sulfonate having the respective formulae as set forth and defined above. R, R' and $R_1$ are relatively large groups containing 10 to 20 carbon atoms. Examples of alkyl groups for R, R' and $R_1$ are lauryl, myristyl, palmityl and stearyl. Examples of alkylene groups for OR and for $R_1$ are $C_{10}$-$C_{16}$ alpha olefins. Examples of alkaryl groups for OR and $R_1$ are decylbenzene, dodecylbenzene and propylnapthalene. Examples of alkyl polyether groups are

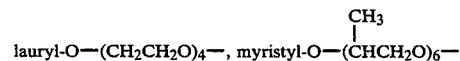

and those derived from commercial homolog mixtures wherein, for example, R' may be mixtures of $C_{10}$ and $C_{12}$ or $C_{12}$ and $C_{14}$ alkyl groups and n may be various integers within the stated ranges. Preferred —OR groups are alkylenoxy groups, especially alpha olefins containing from 10 to 14 carbon atoms, and alkylbenzyloxy in which the alkyl group contains from 10 to 16 carbon atoms.

As to the carboxylic acid salt, $R_2$ is preferably a straight chain alkyl group, and more preferably one having from 8 to 20 carbon atoms. Examples of alkyl groups for $R_2$, are pelargonyl, lauryl, myristyl, palmityl, stearyl and the like.

$M$ and $M_1$ are monovalent cations providing water solubility, such as the alkali metals, especially sodium, potassium or lithium; ammonium or substituted ammonium. Sodium, potassium and ammonium are preferred for M, and potassium and ammonium are preferred for $M_1$. In this connection a sodium α-olefin sulfonate and potassium stearate provide an especially preferred combination.

The mixture is prepared simply by bringing together the anionic surface active sulfate or sulfonate and the carboxylic acid salt in water. One or more of the components may be formed in situ. For example, the carboxylic acid salt may be formed in situ by adding the carboxylic acid and the desired base. Heating may be required to achieve solution conveniently.

The pH of the composition should be neutral to mildly alkaline, with a pH between about 7.5 and about 8.5 being preferred. While combinations of sulfonate and sulfate may be employed, it is preferred to use one or the other.

From the standpoint of forming foam the concentration of the combination in the water may range widely from as low as about 1%, by weight, up to about 30%, by weight. However, from the standpoint of storage and transportation, a concentrate is preferable to avoid handling larger amounts of water. The concentrate can then be diluted with water at the site of use. At the time of foam production the concentration of the combined foaming agents, A and B, is preferably between about 1 and about 3%, by weight.

At the time of foam production, the liquid composition may be pumped at, for example, 400 to 500 PSIG, through a flow controlling orifice at a pre-determined flow rate. Downstream of the liquid flow control orifice, air is injected and mixed with the liquid stream. This may be achieved by using an air orifice to control the flow in the same manner as the liquid side of the system. An air compressor generates a regulated air pressure. After the two streams are combined, the mixture passes through an exit, such as the end of a hose which may or may not have a distribution nozzle attached. The foam can then be distributed over the area to be covered, as by manually directing the hose nozzle. Similarly, the output may be directed into a multiported manifold for distribution. This manifold depending upon its size and the flow rate of foam, may be used to distribute the foam either manually or mechanically via attachment to a suitable vehicle. This vehicle may be towed or it may be self-propelled, and may be completely self-contained in that it may have the liquid storage tank, air compressor, pumping systems, distribution system, and drive mechanism all in one integrated unit.

The foam may be applied under widely varying atmospheric temperature conditions including freezing. At atmospheric temperatures at or below freezing the foam surface simply freezes.

The degree of hardness of the water used to produce foam according to the present method can have an effect on the life of the resulting foam. Accordingly, in situations where the degree of hardness of the water available for preparing the composition in concentrate form or at the site may have a deleterious effect on the desired foam, a water hardness control agent may be incorporated in the composition to bind the calcium and/or magnesium present in the water. Examples of suitable hardness control agents are ethylenediamine tetraacetic acid, sodium and potassium tripolyphosphate and polyacrylates. The amount of hardness control agent used will be dictated, as is well known, by the degree of hardness of the particular water available and the extent it is desired to diminish that degree of hardness. Potassium tripolyphosplate is a preferred hardness control agent.

The foam produced according to the present method without anything used other than the sulfate or sulfonate A and carboxylic acid salt B, will be white in appearance. This may be objectionable in certain locales. In such situations it has been found that the incorporation of a small amount of carbon black in the composition will convert the appearance of the foam to an off white, light gray, medium gray or dark gray appearance, depending upon the amount of carbon black employed. The amount of carbon black employed may range from about 0.01% to about 2% based on the composition at the diluted concentration to be converted to foam.

A thickener/dispersant may be incorporated in the composition to be converted into foam, and an example of suitable thickener/dispersants are polymeric acrylates sold as thickener/disperants, like Acrysol ICS-1 and Acrysol A-3 of Rohm & Haas Company.

The invention will be more readily understood from a consideration of the following specific examples which are given for the purpose of illustration only and are not intended to limit the scope of the invention in any way.

EXAMPLE I

To warm (40° C.) water are added potassium hydroxide, stearic acid (a commercial grade containing principally 16 and 18 carbon atoms) and sodium α-olefin sulfonate (a commercial grade containing principally 10 and 12 carbon atoms) in amounts to produce the following amounts:

TABLE I

|  | % by weight |
|---|---|
| Sodium α-olefin sulfonate (100% active basis) | 4.00 |
| stearic acid (100% active basis) | 3.60 |
| KOH | 0.71 |
| Water | 91.69 |

This composition has an equilibrium viscosity of approximately 1200 cps. at 25° C. The viscosity of the foaming composition can vary with time and temperature. To reproduce similar viscosity readings with two samples of the same composition they should have been at rest for about 300 minutes at the same temperature.

Variations of this composition can be made at more concentrated levels by doubling (2X) or tripling (3X) the three principal reactants. Each composition may be used as such in the production of foam or each may be diluted with water, at the time of foam production, down to the extent equivalent to about 10:1 for the composition shown in the above table.

Thus, the composition set forth in Table I may be used as such to produce foam for a two or three day coverage of, for example, a landfill, whereas the same composition may be diluted 8:1 for a shorter term truck transport odor control foam application.

The composition of Table I was tested for 25% drain time as follows: the composition was converted to foam at the rate of one gallon of composition/minute with air pressure equal to 70-80 psig. at the mixing chamber. A ½" ID x 20' foam hose without nozzle was used. After foam generation has been started and stabilized, the foam was sprayed directly into a tank having a conical bottom. Foam was collected for 60 seconds, and assumed to be equivalent to 3785 grams (one gallon). A small fluid outlet at the bottom allowed the "drained" foam to exit. The drainage liquid was collected and weighted as a function of time. The weight of drainage liquid in grams at any time divided by 3785 yielded the fractional drainage. Multiplying by 100 converted this number to percent drainage. For sake of uniformity throughout the Examples, the time, in minutes, for 25% drainage is recorded.

The 25% drain time for the composition of this example is 1000 minutes at 25° C.

EXAMPLES II AND III

Compositions and foams therefrom are provided from the following materials in % by weight, following the procedure of Example I.

TABLE II

|  | II | III |
|---|---|---|
| sodium α-olefin sulfonate, $C_{10}$-$C_{12}$ (100% active basis) | 4.00 | 4.00 |
| stearic acid (100% active basis) | 3.60 | 3.60 |
| NaOH | 0.51 | — |
| NH$_4$OH | — | 0.44 |
| Water | 91.89 | 91.96 |
| Viscosity (cps. @ 25° C.) | 20,000 | 500 |

These compositions have characteristics which, from some standpoints, make them less desirable than compositions using the potassium carboxylate; for example, the sodium carboxylate system is less soluble presenting problems with concentrates, and the ammonium carboxylate system has an odor (of ammonia) that might be objectionable in some situations.

EXAMPLES IV-IX

Following the procedure of Example I the following compositions are prepared and converted to foams. In all cases the percentages are by weight on the basis of 100% active material, and the stearate is given as the resulting potassium salt form although prepared by mixing stearic acid with potassium hydroxide as in Example I.

TABLE III

|  | IV | V | VI | VII | VIII | IX |
|---|---|---|---|---|---|---|
| sodium α-olefin sulfonate, $C_{10}$-$C_{12}$ (100% active basis) | 3.43 | 4.0 | 2.0 | 1.0 | 2.0 | 2.0 |
| potassium stearate (100% active basis) | 3.51 | 4.08 | 2.04 | 1.02 | 2.04 | 2.04 |
| polymeric thickener (K+)* (100% active basis) | 0 | 0.35 | 0.35 | 0.41 | 0.47 | 0.59 |
| Water | bal. | bal. | bal. | bal. | bal. | bal. |
| 25% drain time @ 25° C. (min.) | 2500 | 1230 | 315 | 555 | 990 | 4000 |
| viscosity (cps. @ 25° C.) | 1000 | 88 | 23 | 510 | 320 | 3750 |

*Acrysol ICS-1 of Rohm & Haas Company, 30% solids.

EXAMPLES X-XI

Following the procedures of the foregoing examples, compositions (% by weight) are prepared and foamed using sodium dodecylbenzenesulfonate as follows:

TABLE IV

|  | X | XI |
|---|---|---|
| sodium dodecylbenzene sulfonate* (%) | 3.7 | 4.4 |
| potassium stearate | 3.4 | 4.1 |
| polymeric thickener (K+)** | 0 | 0.35 |
| Water | bal. | bal. |
| 25% drain time @ 25° C. (min.) | 570 | 570 |
| viscosity @ 25° C. (cps.) | — | 1850 |

*commercial product containing principally 12 to 16 carbon atoms.
**Acrysol ICS-1 of Rohm & Haas Company

EXAMPLES XII-XIV

For comparison purposes compositions were prepared using single surfactants:

XII sodium lauryl sulfate, XIII sodium α olefin sulfonate, $C_{10}$-$C_{12}$, and XIV sodium dodecylbenzene sulfonate. In concentrations ranging from 0.25% to 10.0%, the resulting foams had 25% drain times less than 10 minutes and complete drainage (100%) in less than 45 minutes. The viscosity of these systems is about 1 cp.

EXAMPLE XV

In this example there are mixed in water an alkylethersulfate (Lauryl —O—(CH$_2$CH$_2$O)$_4$—SO$_3$Na), stearic acid and triethanolamine to give the following proportions, by weight, with the stated results when converted to foam:

TABLE V

| alkylethersulfate (%, by weight) | 3.0 |
|---|---|
| stearic acid (%, by weight) | 5.0 |
| triethanolamine (%, by weight) | 2.65 |
| Water | 84.35 |
| Viscosity at 25° C. (cps.) | 125 |
| 25% drain time at 25° C. (min.) | >1200 |

EXAMPLE XVI

The composition of Table I (diluted 2:1) is foamed and the foam is applied to the top of sewage sludge (13-15% solids) held in a barge 28'×160'. The foam layer is approximately 4" thick. A portion of the sludge was left uncovered for comparison purposes. Before covering with foam and after the foam cover was complete, the odor was evaluated using a portable combustible gas analyzer. The probe of this device was held just above the sludge or foam covering. The reduction in odor (in terms of combustible gases) was found to be 80-90%.

After an 8-10 hour open water trip, a similar reading was taken at the unloading point. Although the foam continuity had been broken due to vigorous wave action, the analyzer still indicated a 50% lower value over the foam than the uncovered sludge.

EXAMPLE XVII

A large (100' diameter by 13' deep) open top concrete tank used for holding waste polymer by-products was scheduled to be cleaned and the contents transported to and deposited in a hazardous waste landfill. The same operation previously had generated many odor complaints, especially during transportation.

Water covering the tank contents was removed, and the contents were covered with foam prepared from the composition of Table I diluted with water (5 water:1). The foam layer was approximately 3" thick.

Over a two week period approximately 40 to 50 truckloads of cement (dry, 50,000 pounds per truck load) were added to the tank contents and mixed using a backhoe. The mixture solidified into a dirt-like material. The material was loaded into conventional, open top gravel trucks (40' trailers), covered with foam prepared from the composition of Example 1 diluted with water 5:1, with a foam layer thickness at approximately 2". A tarpaulin was secured over the top of the trailer, and the trucks were driven about 20 miles to a hazardous waste landfill. There the contents were dumped and either covered with foam prepared as above or immediately buried.

Approximately 8,000,000 pounds of material were transported to the landfill in this manner in about 170 truck trips. The entire operation was completed without odor complaints.

EXAMPLES XVIII

At the close of a working day, the compacted working face of a sanitary landfill, instead of being covered with dirt, was covered with about 3 inches of foam prepared from the composition of Table I diluted with water 5:1. The landfill had a slope generally of about 4 to 1, and a rough, irregular surface resulting from normal landfill operations using heavy earthmoving equipment.

The following morning the foam cover remained as applied with no evidence of flowing or discontinuities. The new added waste is placed on top of the foam crushing it and thus reusing the air space previously occupied by the foam.

It was noted that when flying insects, especially common house flies, contact the foam, they become wetted and are no longer able to fly. Futile attempts to escape eventually result in their death.

It was also noted that the wet foam acts as a trap for blowing trash, like paper, which adheres to it and can thus be buried during the next operation.

It was further noted that the foam covers water, as in puddles and pools, and mud as well as relatively dry material, and can be applied immediately after rain.

EXAMPLE XIX

Carbon black in the amount of 2% is mixed with the composition of Table I and the product diluted with water 5:1. The material is foamed and applied to the working face of a sanitary landfill as in the preceding example. The resulting foam layer is dark gray in appearance and is not as noticeable as the otherwise white foam produced by the composition without the carbon black.

EXAMPLE XX-XXIII

These examples illustrate the effect of potassium tripolyphosphate on foam systems using water of varying hardness. Compositions were prepared as follows in terms of %, by weight:

TABLE VI

|  | XX | XXI | XXII | XXIII |
|---|---|---|---|---|
| sodium α-olefin sulfonate (100% active basis) | 0.8 | 0.8 | 0.8 | 0.8 |
| potassium stearate (100% active basis) | 0.82 | 0.82 | 0.82 | 0.82 |

TABLE VI-continued

|  | XX | XXI | XXII | XXIII |
|---|---|---|---|---|
| polyacrylic acid (potassium salt) (100% active basis)* | 0.28 | 0.28 | 0.28 | 0.28 |
| Potassium tripolyphosphate | 0 | 0.08 | 0 | 0.08 |
| water, with hardness of | 125 ppm Bal. | | 500 ppm Bal. | |
| 25% drain time @ 25° C. (min) | 114 | 216 | 69 | 210 |

*Acrysol A-3 of Rohm & Haas Company

What is claimed is:

1. The method of forming a barrier layer between a substrate and the outdoor atmosphere, wherein the substrate is a material producing dust, noxious fumes, or odors or blowing trash, or a plant subject to damage from adverse atmospheric conditions, which comprises applying to the substrate an essentially biodegradable foam prepared from an aqueous composition comprising, in an approximately 1:1 molar ratio, (A) at least one anionic surface active sulfate having the formula

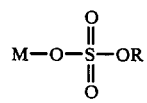

where —OR is an alkoxy, alkylenoxy or alkaryloxy group having from 10 to 20 carbon atoms or an alkyl polyether group

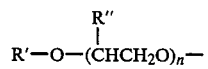

in which R' is an alkyl group containing from 10 to 20 carbon atoms, R" is H or an alkyl group containing up to 4 carbon atoms, and n is an integer from 1 to 12, or a sulfonate having the formula

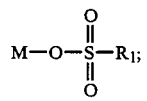

where $R_1$ is an alkyl, alkylene or alkaryl group containing from 10 to 20 carbon atoms, and where M is a monovalent cation, and (B) a carboxylic acid salt, $R_2COOM_1$, where $R_2$ is an alkyl group containing from 8 to 30 carbon atoms and $M_1$ is a monovalent cation.

2. The method of claim 1 wherein A is an α-olefin sulfonate containing principally 10 to 16 carbon atoms.

3. The method of claim 1 wherein —OR is an alkylbenzyloxy group in which the alkyl group contains from 10 to 16 carbon atoms.

4. The method of claim 1 wherein B is a salt of a fatty acid containing principally 8 to 20 carbon atoms.

5. The method of claim 1 wherein B is a potassium or ammonium salt.

6. The method of claim 1 wherein A is a sodium α-olefin sulfonate containing principally 10 to 16 carbon atoms, and wherein B is a potassium salt of a fatty acid containing principally 8 to 20 carbon atoms.

7. The method of claim 1 wherein B is potassium stearate.

8. The method of claim 1 wherein the composition contains also a water hardness control agent.

9. The method of claim 8 wherein the water hardness control agent is a tripolyphosphate.

10. The method of claim 1 wherein the composition contains also carbon black.

11. The method of claim 1 wherein the composition contains a water hardness control agent and carbon black.

* * * * *

UNITED STATES PATENT AND TRADEMARK OFFICE
CERTIFICATE OF CORRECTION

PATENT NO. :  4,874,641

DATED :  October 17, 1989

INVENTOR(S) :  Paul A. Kittle

It is certified that error appears in the above-identified patent and that said Letters Patent is hereby corrected as shown below:

Column 6, Table IV, "570" in column XI should read --1170--.

Signed and Sealed this

Twenty-third Day of October, 1990

Attest:

HARRY F. MANBECK, JR.

*Attesting Officer*    *Commissioner of Patents and Trademarks*